(12) United States Patent
Nedelec

(10) Patent No.: US 8,025,996 B2
(45) Date of Patent: Sep. 27, 2011

(54) ELECTRICAL CONNECTION TERMINAL FOR ELECTRIC POWER STORAGE CELL

(75) Inventor: Luc Nedelec, L'Hopital Camfrout (FR)

(73) Assignee: Batscap, Ergue-Gaberic (FR)

( * ) Notice: Subject to any disclaimer, the term of this patent is extended or adjusted under 35 U.S.C. 154(b) by 729 days.

(21) Appl. No.: 11/988,844

(22) PCT Filed: Jul. 13, 2006

(86) PCT No.: PCT/EP2006/064223
§ 371 (c)(1),
(2), (4) Date: Jan. 14, 2008

(87) PCT Pub. No.: WO2007/006809
PCT Pub. Date: Jan. 18, 2007

(65) Prior Publication Data
US 2009/0253034 A1 Oct. 8, 2009

(30) Foreign Application Priority Data
Jul. 13, 2005 (FR) ...................................... 05 07526

(51) Int. Cl.
*H01M 2/24* (2006.01)
(52) U.S. Cl. ........ 429/158; 429/159; 429/160; 429/181; 429/185

(58) Field of Classification Search ............... 429/149, 429/158, 159, 160, 161, 163, 185, 186, 178, 429/181
See application file for complete search history.

(56) References Cited

U.S. PATENT DOCUMENTS

| 6,071,638 A * | 6/2000 | Fradin ............................ 429/94 |
| 2004/0224227 A1 * | 11/2004 | Ozawa et al. ................. 429/211 |

FOREIGN PATENT DOCUMENTS

| EP | 0854525 A | 7/1998 |
| EP | 1184916 A | 3/2002 |
| EP | 1193779 A | 4/2002 |
| JP | 09-147832 A | 10/1997 |

\* cited by examiner

*Primary Examiner* — Raymond Alejandro
(74) *Attorney, Agent, or Firm* — Blakely, Sokoloff, Taylor & Zafman

(57) ABSTRACT

An electric power storage cell including several electrochemical elements connected in series and/or in parallel, arranged inside a sealed casing. The casing electrically connects the electrochemical elements to a power connecting device outside the casing. The electrical connection is configured so that the casing can be traversed without affecting adversely the tightness thereof and without transmitting stresses to the casing. The storage cell has applications in the field of lithium polymer technologies with high power storage assemblies.

14 Claims, 4 Drawing Sheets

ELECTRICAL CONNECTION TERMINAL FOR ELECTRIC POWER STORAGE CELL

The present patent application is a non-provisional application claiming the benefit of International Application No. PCT/EP2006/064223, filed Jul. 13, 2006.

FIELD OF THE INVENTION

The invention concerns electrical energy storage assemblies. It applies, in particular, but non-limitatively, to batteries of the lithium polymer type. More precisely, this present invention concerns the sealing and the electrical connection of electrical energy storage cells forming an electrical energy storage assembly.

PRESENTATION OF THE PRIOR ART

A large number of energy storage assemblies, called high energy storage assemblies, have been proposed in recent times, such as lithium polymer assemblies for example.

However the known devices have not been totally satisfactory in respect of the sealing of the power connections to their electrical energy storage cells.

This is an objective that people have already sought to attain in many implementations, though never producing results that are fully satisfactory.

Conventionally, an electrical energy storage cell includes a sealed casing in which are placed different electrochemical elements which are connected by electrical link means and at least one electrical connection that has electrical link terminals of opposite polarity projecting outside of the casing.

During the assembly of an electric energy storage cell, the terminals are fixed to the casing, inside the cell, by bolted means, screwed means or by cold working of the metal of their component elements.

Mention will also be made of the use of sealing washers or indeed of o-rings to reinforce the sealing of the electrical link terminals, and as a consequence of the electrical connection.

However up to the present time, these creations have had as their common feature the at least partial penetration of the electrical connecting terminals into the inside of the casing of the electric energy storage cell in order to be attached there.

This attachment is a complex process, and the presence of the terminals inside the cell favours their exposure to the electrolyte environment of the electrochemical elements, thus giving rise to sealing problems.

The invention in particular aims overcome the drawbacks of the prior art.

One objective of the present invention is to propose an electric energy storage cell that offers a sealed electrical connection system while still presenting a precise, simple, secure and reliable electrical connection. Another objective of the present invention is to propose an electric energy storage cell that offers a sealing system that has a simple and effective configuration.

It is also desirable to propose electrical link terminals that offer a saving in terms of costs, weight, and space in the creation of an electric energy storage cell.

SUMMARY OF THE INVENTION

According to the invention, these aims are achieved, by means of an electric energy storage cell that includes several electrochemical elements connected in series and/or in parallel, placed inside a sealed envelope, where said envelope includes means for electrical connection of the electrochemical elements to a power connecting device outside of the envelope, characterised in that the electrical connecting means include means that are suitable to allow passage through the said envelope without affecting the sealing thereof, and without the transmission there to of support stresses.

More precisely, the invention proposes an electric power storage cell that includes electrical connecting means for the said electrochemical elements on the inside of the envelope, and in which the electrical connecting means include electrical connecting terminals placed in two passages that pass through the envelope, where the electrical connecting means include two connecting plates respectively associated with the electrical connecting terminals, said terminals each including an electrical stud and a pin, where the two pins, together with the means to prevent pin rotation, are used to secure the two connecting plates respectively to the two electrical connecting studs by means of clamping means, where said clamping means also effects the rings by the clamping of two sealing rings, each inserted between a shoulder on a stud and the sealing envelope.

According to an advantageous characteristic of the invention, the connecting plates are inserted between the electrical connecting studs and the pins.

According to another advantageous characteristic of the invention, a connecting assembly that includes an electrical connecting terminal which includes an electrical stud and a pin, a sealing envelope and a connecting plate, includes an electrically-conducting connecting part and spring elements, with the said spring elements holding the connecting part in close contact on two terminals of two adjacent cells, with an intermediate contact part being interposed between the connecting part and each of the terminals in order to favour the electrical contact between the said parts.

BRIEF DESCRIPTION OF THE FIGURES

The invention will be more clearly understood, and other advantages and characteristics will emerge more clearly on reading the description that follows and which is provided by way of a non-limiting example and with reference to the appended drawings.

DETAILED DESCRIPTION OF THE INVENTION

Figure 1:
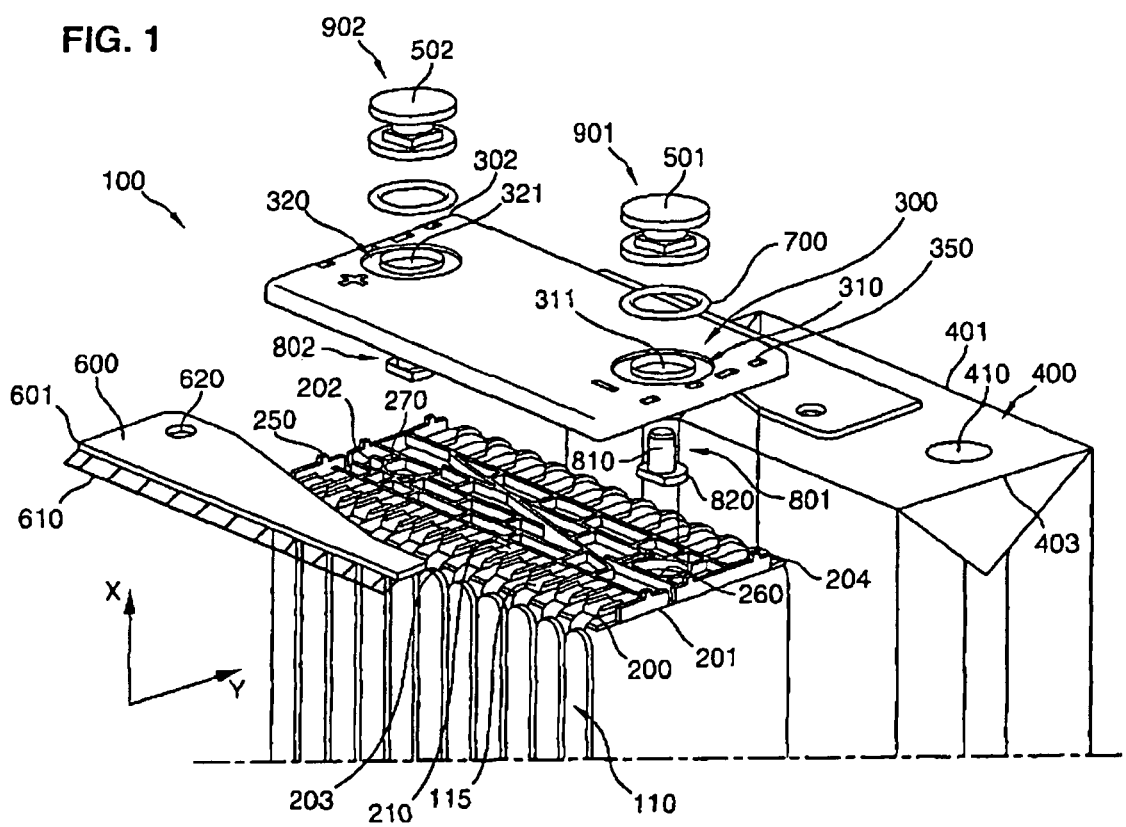
FIG. 1 illustrates a view in perspective of the assembly of an electric energy storage cell according to the invention.

FIG. 1 illustrates the different elements forming an electrical energy storage cell 100 according to the invention.

Figure 6:
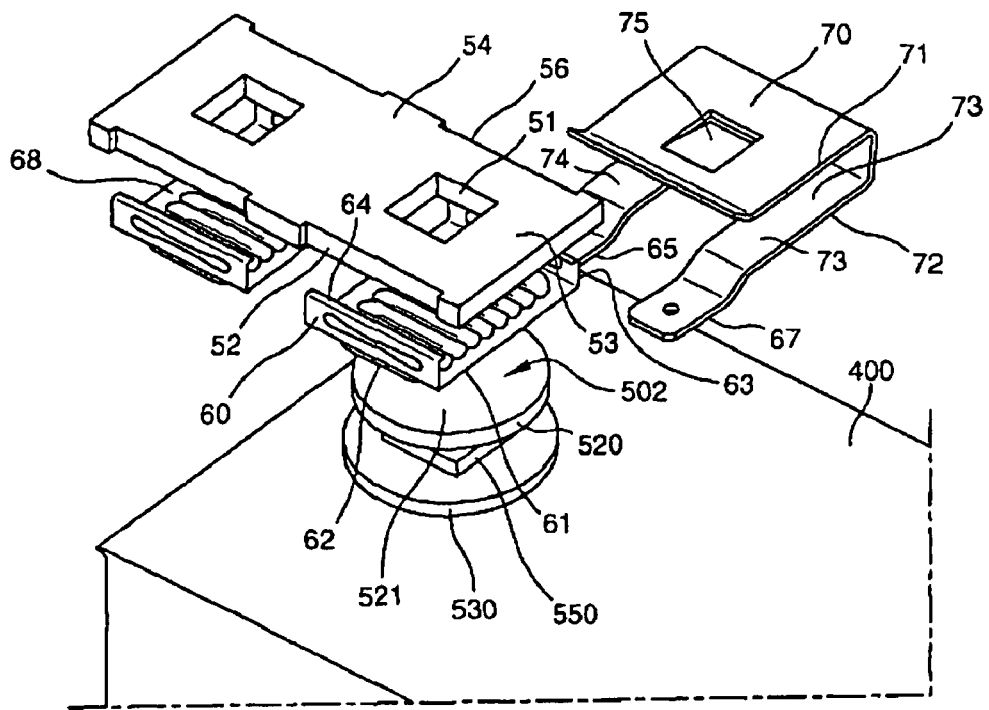
FIG. 6 illustrates a partial view in perspective of the electrical assembly, in series, of electrical connecting studs of electrical energy storage cells via a power connecting device.
Figure 7:
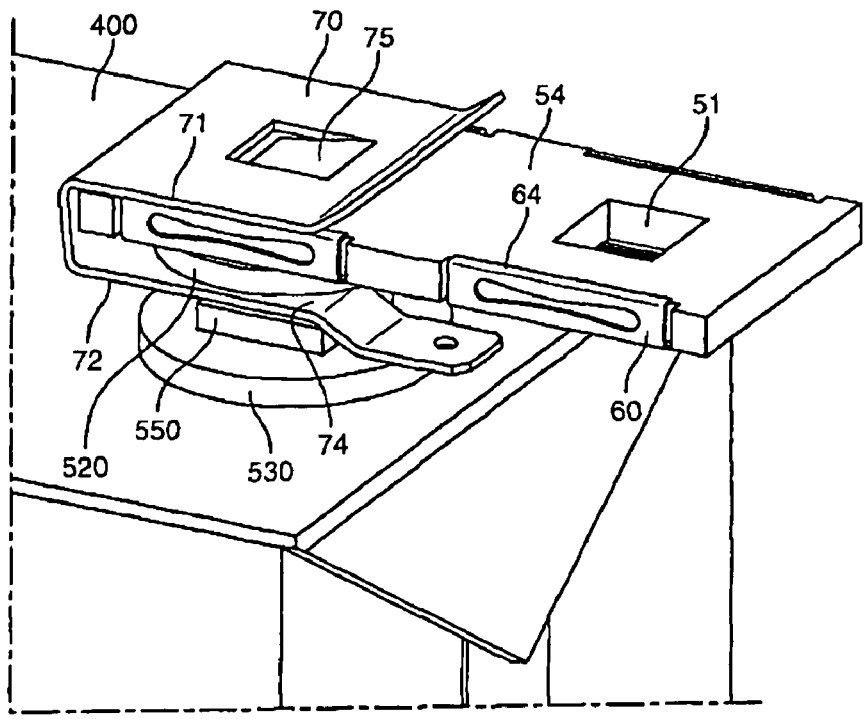
FIG. 7 illustrates a view in perspective of an electrical stud of an electric energy storage cell assembled electrically to the power connecting device.

An electrical energy storage cell 100 includes a sealed envelope 400, including two traversing passages 410, several electrochemical elements 110 placed inside the envelope 400, electrical link means 600 for said electrochemical elements 110, inside the envelope 400, and means for electrical connection of the electrochemical elements 110 to a power connecting device outside of the envelope 400, with this device being illustrated in FIGS. 6 and 7.

These electrical connecting means include electrical connecting terminals 901, 902 placed in the passages of the envelope 400 and, also, a set of two plates of rectangular shape, a bottom plate 200 and a top plate 300, placed inside the envelope 400.

These means will allow one to pass through the envelope without affecting the sealing there of and without the transmission of support stresses thereto on the part of the electrical connecting terminals 901, 902.

The sealing envelope 400 takes the form of a rectangular casing shown in the figure with its length on the X axis and its width on the Y axis.

The two traversing passages 410 are circular and respectively present, on the two opposite ends 402, 403 of the top face 401 of the envelope 400, the face perpendicular to the X axis.

The sealing envelope 400 is preferably flexible and includes a metal layer forming a waterproof barrier.

It houses an arrangement of parallel electrochemical elements 110, of substantially rectangular shape, lying longitudinally along the X axis.

The two rectangular-shaped plates 200, 300, have a length and a width designed to cover the top section of the arrangement of electrochemical elements 110, perpendicular to the X axis.

Each of these is preferably semi-rigid and made of plastic.

Inside the envelope 400, the bottom plate 200 is placed in contact with the section of electrochemical elements 110, while the top plate 300 is in contact with the sealing envelope 400.

In addition, the bottom plate 200 includes a network of ribs 210 each designed to accommodate one electrode of the electrode pair 115 of an electrochemical element 110.

This network 210 lies along the longitudinal ends 203, 204 of the bottom plate 200.

The electrodes 115 are thus placed in a plane that is perpendicular to the X axis, in contact with the bottom plate 200.

These electrodes 115 are connected to the electrical link means 600 and, more precisely, to two connecting plates 600 surmounting the bottom plate 200.

A connecting plate 600 is composed of a concentrator 600 of electrical energy.

A single concentrator 600 is illustrated in FIG. 1. It is of more-or-less triangular shape, and lies, in terms of its length, perpendicularly to the X and Y axes.

It includes a series of juxtaposed individual connection means 610, each designed to connect with one electrode 115 of the same polarity of an electrode pair 115.

These means 610 are placed along the longitudinal end 601 of the concentrator 600, the end parallel to the longitudinal end 203 of the bottom plate 200.

In addition, close to its ends 301, 302 the top plate 300 has two circular holes 311, 312.

These holes 311, 321 are extended, on the top face of the top plate 300 parallel to the X axis, respectively by two circular collars 310, 320.

Their position will coincide with those of the two traversing passages 410 of the sealing envelope 400.

In addition, the external diameter of the passages 410 is substantially identical to the internal diameter of the two collars 310, 320.

The traversing passages 410 and the holes 311, 321 provide a crossing in the envelope 400 and in the top plate 300 to two electrical link terminals 901, 902, of negative and positive polarity respectively.

These two terminals 901, 902 each respectively includes a pin 801, 802 and an electrical connection stud 501, 502. The electrical connection studs 501, 502 will be described later with reference to FIGS. 2 and 3.

With the two circular holes 311, 312 of the top plate 300 providing a passage through the plate 300, the studs 501, 502 are attached, inside the cell 100, to the two concentrators 600, by means of a screw thread on the pins 801, 802.

Each pin 801, 802 includes a threaded extended body 810 parallel to the X axis, and an annular shoulder 820 centred on the body 810.

Figure 5:
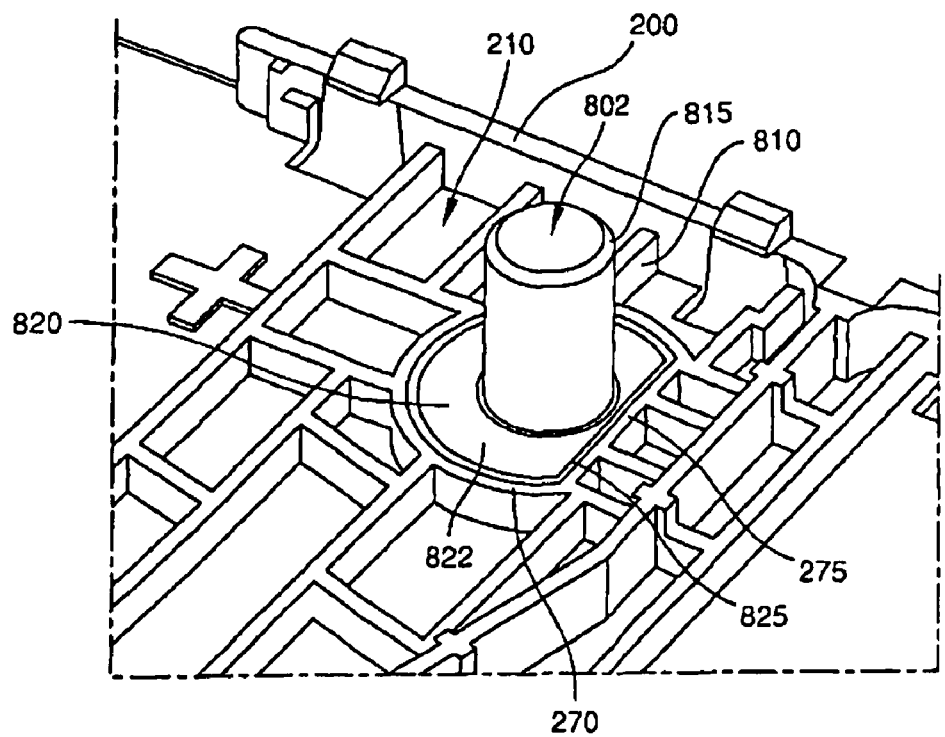
FIG. 5 illustrates a view from above of the assembly of a pin on a plate of an electric energy storage cell.

Each of these pins 801, 802 is mounted in a housing provided for this purpose on the bottom plate 200 as described with reference to FIG. 5 for pin 802. In this figure, it can be seen that the latter is associated with means to prevent rotation.

In fact it is housed in a complementary shape 270 that has a flat spot 275 created in the bottom plate 200, by the bottom face 821 of its shoulder 820 having an identical flat spot 825 on its circular profile.

Returning to FIG. 1, two casings 260, 270 for the pins 801, 802 are placed respectively at each of the ends 201, 202 of the bottom plate 200 so as to coincide with the circular holes 311, 321 in the top plate 300. In addition, each pin 801, 802 is mounted to float in its casing 260, 270 and in a hole 620 in the connecting plate 600 in order to allow self-centring of the pin in relation to the terminal.

Each of the concentrators 600 is screwed onto one of the pins 801, 802 through a circular hole 620, whose internal diameter is matched to that of the extended body 810 of the pins 801, 802 and it is then click-fitted to the bottom plate 200.

In addition, on these two widths 201, 202, the latter includes a series of click-on fittings 250 that are designed to mate with reception elements 350 respectively present on the widths 301, 302 of the top plate 300, in order to click-fit the top plate 300 onto the bottom plate 200, thus enclosing the concentrators 600 and the annular shoulders 820 of the aforementioned pins 801, 802.

Another embodiment could include the presence of the click-on fittings 250 on the top plate 300 and the reception fittings 250 on the bottom plate 200.

The extended bodies 610 of the pins 801, 802 project outwards from the top plate 300 via the two holes 311, 321.

In addition, the pins 801, 802 mate in a complementary manner with the two electrical connection studs 501, 502 which will now be described with reference to FIGS. 2 and 3.

Figure 2:
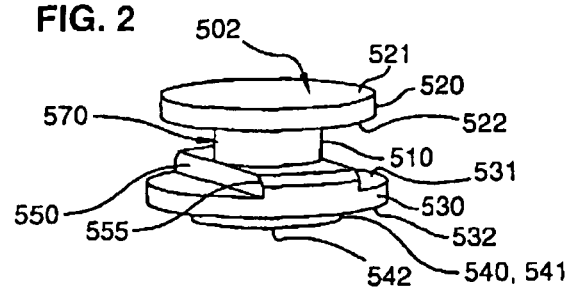
FIG. 2 illustrates a side view of an electrical stud of an electric energy storage cell according to the invention.

FIG. 2 shows the electrical connection stud 502 configured to be fixed onto the electrical energy storage cell 100, essentially on the outside of the sealing envelope 400.

This stud 502 whose role is to provide electrical conduction from the interior of a cell 100, which contains all of the electrochemical elements 110, to the exterior, includes a cylindrical main shaft 510 lying parallel to the X axis.

This cylinder 510 is extended by two coaxial annular shoulders 520, 530, of larger diameter, namely a primary shoulder 530 present at the proximal end of the cylinder 510, close to the plate 200, and a secondary shoulder 520 present at the distal end of the cylinder 510, away from the plate 200.

By means of their inner faces 522, 531, these form the branches of an annular channel 570.

In addition, at the proximal end of the cylinder 510, the primary shoulder 530 is surmounted on its inner face 531 by a coaxial stamping 550, which will be used for securing the electrical connection stud 502 onto the electrical energy storage cell 100.

This stamping 550 includes at least one flat spot, and its edges have a fillet 555 formed by a surface that converges toward the primary shoulder 530 as one moves radially toward the exterior.

This fillet 555 will be used to facilitate the attachment of clamping device against the electrical stud 500.

The primary shoulder 530 is also extended, on its outer face 532 by a second coaxial cylinder 540, of smaller diameter, which in part provides the electrical connection to one of the connecting plates 600.

Figure 3:
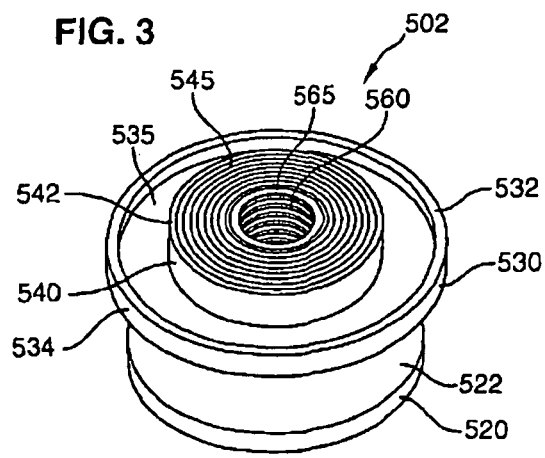
FIG. 3 illustrates a view in perspective of the underside of an electrical stud of an electric energy storage cell according to the invention.

As illustrated in FIG. 3, this second cylinder 540 presents, on its outer face 542, opposite to the outer face 532 of the primary shoulder 530, concentric splines 545, centred on the main shaft 510 playing the role of conducting electrical connectors.

In addition, the electrical link stud 502 is equipped with an internal threaded passage 560 of cylindrical shape. It is coaxial with the main shaft 510 and opens to the exterior at the outer face 542 of the cylinder 540.

This passage 560 is designed to receive and to engage with pin 802 so as to secure the electrical connection terminal 902 to all of the plates 200, 300.

In addition, the primary shoulder 530 of the stud 502 includes, on its outer face 532, an annular channel 535 running around all of its circumference, whose walls are formed by the cylinder 540 and by the outer wall 534 of the primary shoulder 530.

This channel 535 is configured, in both size and shape, to receive a sealing element 700.

This element 700 is preferably a sealing o-ring of circular section.

The top plate 300 includes at least one collar 310, 320 forming, together with the channel 535, a casing of such a nature as to compress the sealing o-ring 700 between each of the studs 501, 502 and the flexible envelope 400 flattened against the top surface of the top plate 300.

Advantageously, each collar 310, 320 of the top plate 300 also constitutes an electrical separator between the edge of the envelope 400 and the cylinder 540 of the studs 501, 502, thus providing the electrical between the envelope 400 and the latter.

Figure 4:
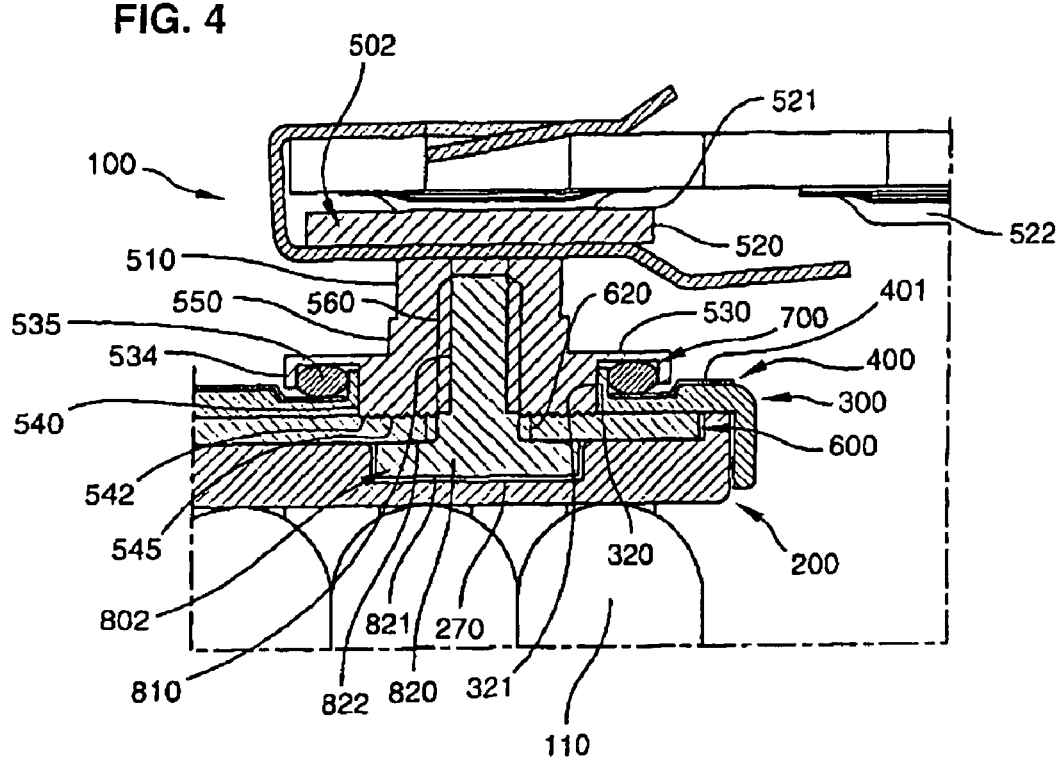
FIG. 4 illustrates a view in partial section at the level of an electrical stud of an electric energy storage cell according to the invention.

Returning to FIG. 1, it can be seen that the two studs 501, 502 as described above with reference to FIGS. 2 and 3, are intended to be placed on the top face 401 of the sealing envelope 400, with their main shaft 510 lying parallel to the X axis. They will allow the electrical link terminals 901, 902 to provide sealed electrical connections through the sealing envelope 400, as illustrated in FIG. 4, by the stud 502.

As illustrated in the figure, the cylinder 540 of the electrical stud 502 is inserted into the hole 321 in the top plate 300 until the concentric splines 545 come up against the concentrator 600.

The cylinder 540 of the stud 502 is centred on the threaded extended body 810 to pin 802, with this pin 802 projecting outside of the envelope 400 via a through passage 410 centred around the collar 320 of the top plate 300.

The installation of the concentrator 600 around the extended body 810 of the pin 802 is preferably facilitated by the presence of a chamfer 815 on the end of the body 810 of the pin 802 opposite to the annular shoulder 820.

This chamfer 815 is determined by a surface that converges toward the shoulder 820 as one moves radially toward the exterior.

With the pin 802 being engaged on the cylinder 540 of the stud 502, the splines 545 present on the inner surface 542 of the cylinder 540 enter into contact with the concentrator 600 and create large compression zones during the attachment of the terminal, thus favouring the quality of the electrical contact.

Advantageously, each electrical terminal 901, 902 creates a direct electrical connection with a concentrator 600 through a passage 410 in the sealing envelope 400 of the energy storage cell 100.

In addition, two elastomer sealing elements 700 are placed on the envelope 400, each around a collar 310, 320 on the top plate 300 projecting outside of the sealing envelope 400.

By engaging the electrical connection stud 502 with the pin 802 via its threaded passage 565, each of the sealing elements 700 is trapped in a closed channel whose branches are formed firstly by the annular channel 535 of the bottom shoulder 530 of the stud 502 and secondly by the collar 320 on the top plate 300.

Advantageously, the studs 501, 502 thus perform the role of sealing elements above the passages 410 passing through the sealing envelope 400.

According to the invention, by securing the stud 502 via the retention stamping 550 allowing the use of an open-ended torque wrench, it is possible not only to effect the electrical contact of the stud 502 onto the concentrator 600 but also clamping of the sealing element 700 onto the envelope 400 in the closed channel.

Advantageously, in a single clamping operation, a suitable clamping pressure can guarantee the electrical concentrator 600/stud 502 contact and the correct clamping pressure on the ring 700 in the channel 535 in order to guarantee the sealing of the stud 502/envelope 400 junction.

This construction enables to avoid direct electrical contact between the two studs 501, 502 in a cell 100 by means of the section of the flexible conducting envelope 400.

Indeed, the collars 310, 320 allowing the electrical separation of each stud 501, 502 in the cell 100 and the section of the envelope 400 prevent short circuits occurring in the cell 100.

Advantageously, the electrical link terminals 901, 902 do not open into the cell 100. They provide a sealed electrical through connection at the level of the traversing passages 410 of the sealed electrical through connection at the level of the traversing passages 410 of the sealing envelope 400.

In FIG. 4, we also see an example of a power connecting device used to electrically connect several electrical energy storage cells 100.

This system will now be described with reference to FIGS. 6 and 7.

This system includes an electrically-conducting part 54 as well as two spring elements 70 for the connection in series of two electrical link studs 500, 502 of a pair of electrical energy storage cells 100.

As illustrated in FIG. 6, the electrical link stud 502 of the cell 100 is linked to an electrical link stud 500 of the neighbouring cell (not illustrated) by means of a busbar 54 of substantially rectangular shape.

One end 53 of the busbar 54 is positioned perpendicularly to the shaft 510 of the electrical link stud 502, on the outer face 521 of the primary shoulder 520.

At this end 53, the busbar 54 has a square cut-out 51, centred on the shaft 510 of the electrical connection stud 502, which will act as a locating point for the installation of a spring element 70 that firstly provides the grip for the electrical connection stud 502/busbar 54 contact, and also the grip for the electrical connection stud 502/interconnection system contact 10, as will be described with reference to FIG. 8. This busbar 54 also has, at this end 53, on either side of the square cut-outs 51, two cut-back recesses 52, 56 lying on each longitudinal side of the busbar 54.

The length of the opposing recesses 52, 56 is identical, and corresponds substantially to the external diameter of the electrical connection stud 502.

These recesses 52, 56 will allow a contact part 60, playing the role of contact between the electrical link stud 502 and the busbar 54, to lock onto the latter.

It takes the form of a rectangular plate 61 of U-shaped cross-section, positioned parallel to the shaft 510.

The length of the plate 61 is designed so that it makes contact, respectively, with the recesses 52, 56 of the busbar 54 and clicks onto the busbar 54.

The click fitting is achieved by bending backwards of the ends 64, 65 of the plate 61 on the top face of the busbar 54.

On the top face 67 that will come into contact with the bottom face of the busbar 54, the plate 61 has a series of adjacent metal leaves 68 forming rectilinear splines.

The busbar 54 is preferably made of tinned copper, and the contact part 60 of beryllium copper.

In addition, the spring element 70 is composed of a clamp 70. This clamp 70 performs the bringing into contact of the primary shoulder 520 of the electrical connection stud 502/ contact part 60/busbar 54 stack, locking onto this assembly by sliding sideways perpendicularly to the shaft 510 of the stud 502. It takes the form of a part of U-shaped cross-section that includes a plate 71 and a back-plate 72 which are connected by a linking element 73 and assembled, respectively, with the top face of the busbar 54 and the inner face 522 of the primary shoulder 520 of the stud 502.

The backplate 72 of the clamp 70 is divided, along its length, into two identical brackets 73, 74 placed around the shaft 510 of the stud 502.

In addition, the spring element 70 includes, on its plate 71, a square locking stud which is used to lock the clamp 70 onto the assembly. This stud 75 is located during the sliding action in the square cut-pout 51 of the busbar 54 and is used to prevent the clamp 70 from being dislodged from the electrical connection stud 500 under the mechanical stresses to which the electrical energy storage cell 100 may be subjected.

The use of the clamp 70 allows the application of continuous compression forces to the electrical energy storage cells 100.

The power connection system between several electrical energy storage cells 100 can be the subject of many embodiments. It must not be limited to the illustration provided in the aforementioned FIGS. 6 and 7.

Figure 8:
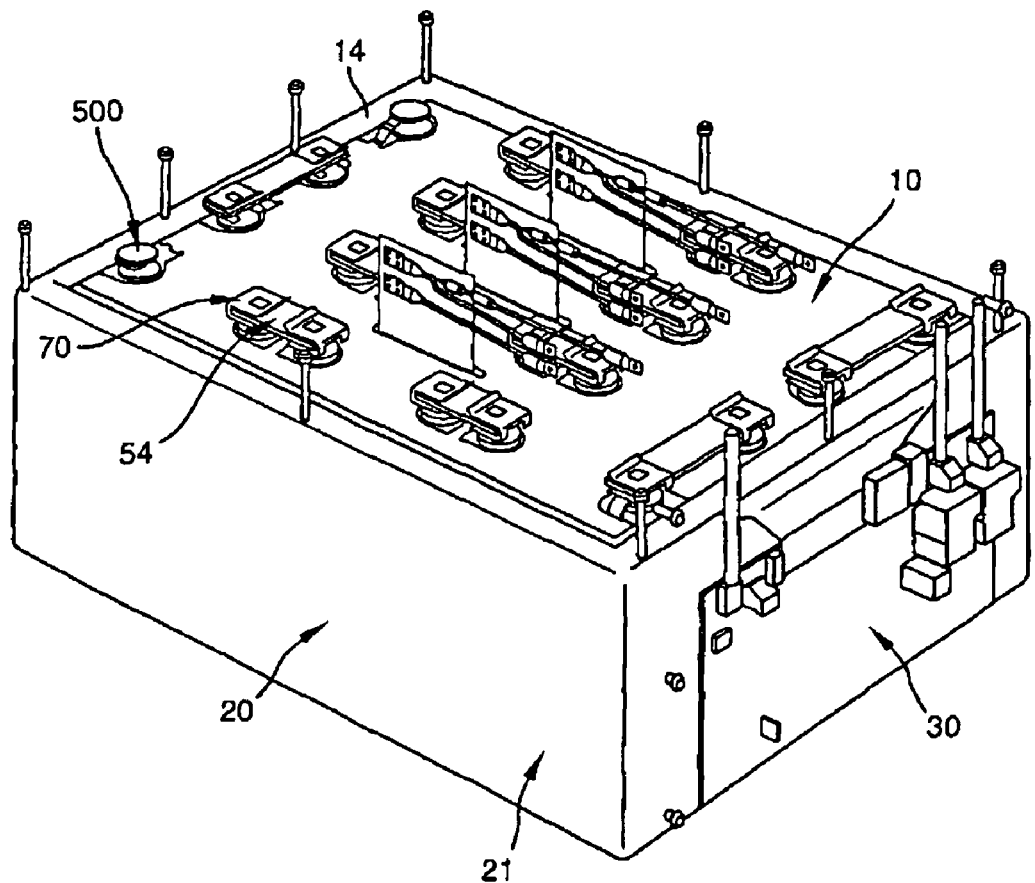
FIG. 8 illustrates a system for the interconnection of a set of electrical energy storage cells with a means for controlling its healts status.

In addition, each electrical connection stud 501, 502 of an electrical energy storage cell 100 according to the invention is also designed so as to allow connection of the cell 100 to a monitoring/control device 30, by means of an interconnection system 10 as illustrated in FIG. 8.

FIG. 8 illustrates an electrical energy storage assembly 20 formed by an arrangement of several individual electrical energy storage cells 100 placed within a rectangular case forming a hermetic enclosure 21.

The interconnection system 10 is placed flat onto the top face of the casing 21 so as to cover the tops of the electrical energy storage cells 100, each with two electrical connection studs 500 of different polarity.

This flexible system 10 advantageously includes a bypass circuit that includes power dissipation resistances as well as a voltage measuring circuit for each of the cells 100 to which it is connected.

Figure 9:
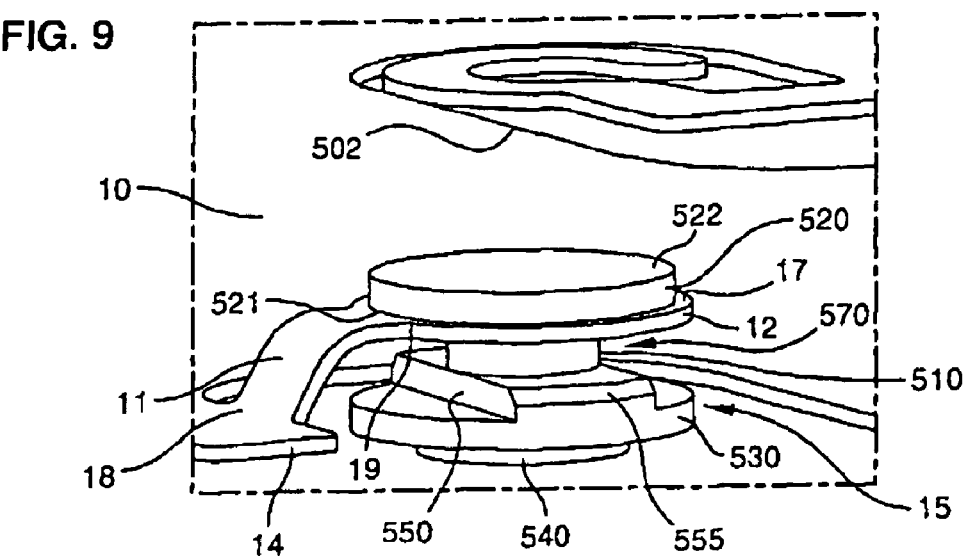
FIG. 9 illustrates the assembly of an electrical stud of an electric energy storage cell with the interconnection system of FIG. 8.

As illustrated in FIG. 9, it also includes cut-outs that are intended to attach it to the studs 500 of the electrical energy storage cells 100.

Consider an example of a cut-out 15 of the interconnection system 10. This includes a straight interconnection jumper 11 which is extended at one end 19 by a connection eyelet 12, and at the other end 18 forms a connection to the interconnection support 10. This eyelet 12 is in the form of a circular arc whose opening angle (not shown) is facing the concave side of the cut-out 15.

The interconnection eyelet 12 of the cut-out 15 slides sideways into the channel 570 formed by the two shoulders 520, 530 of the stud 502 of the cell 100 according to the invention.

More precisely, the opening angle of the eyelet 12 fits in a complementary manner around the shaft 510, at the level of the aforementioned channel 570, in order to allow the top surface 17 of the eyelet 12 to come into contact with the bottom part 521 of the primary shoulder 520 of the electrical connection stud 502.

The opening angle of the eyelet 12 is designed to trap the eyelet 12 in position on the shaft 510.

However there is a height difference between the bottom part 521 of the primary shoulder 520 of the electrical connection stud 502 and the top surface 17 of the interconnection eyelet 12 of the interconnection support 10.

In order to bring them into in contact, the height difference is compensated for by means of the interconnection jumper 11, which deforms by torsion. The length of the jumper 11 will be used to cope with a difference of altitude between the eyelet 12 and the support 10 while still allowing alignment of the eyelet 12 with the electrical connection stud 500.

The spring element 70 described with reference to FIGS. 6 and 7 also ensures contact between the electrical connection stud 502 and the interconnection eyelet 12.

Those skilled in the art will be appreciative of an electrical energy storage cell 100 that offers a system for electrical connection through a sealing envelope 400 while still providing a precise electrical connection.

Moreover, this electrical energy storage cell 100 offers the advantage of providing a sealing system that is simple and effective.

Finally, an electrical energy storage cell 100 according to the invention proposes sealing and electrical connection system which, in relation to the known devices of the existing technology, can be used reliably for any assembly for the large-scale storage of electrical energy. As non-limiting examples, one can mention lithium-polymer, Nickel Metal Hydride or lithium-ion assemblies.

Naturally the present invention is not limited to the particular embodiments just described, but includes any variant that remains within its spirit. In particular, this present invention is not limited to the appended drawings. The specific references illustrated in the preceding paragraphs are non-limiting examples of the invention.

The invention claimed is:

1. A cell for the storage of electrical energy that includes several electrochemical elements connected in series and/or in parallel and placed inside a sealing envelope and electrical link means for electrically linking said electrochemical elements inside the envelope, where said envelope includes electrical connecting means for electrically connecting the electrochemical elements to a power connecting device outside of the envelope, said electrical connecting means including two electrical link terminals placed in two passages passing through the envelope, wherein the electrical connecting means include means that pass through said envelope without affecting sealing of the envelope and without transmitting thereto support stresses, the sealing envelope being flexible and including a metal layer forming a waterproof barrier, wherein the electrical link means include two connecting plates respectively associated with the electrical link terminals, said terminals, each including an electrical link stud and a pin, where each pin together with means to prevent rotation of the pin, is used to secure one of the two connecting plates respectively to the two electrical link studs by means of clamping means, where said clamping means also effects the sealing by clamping two sealing rings, each inserted between a shoulder on a stud and the sealing envelope.

2. The cell according to claim 1, wherein at least one of the terminals includes isolation means for isolating the cell electrically from the envelope.

3. The cell according to claim 1, wherein each connecting plate is inserted between one of the pins and one of the electrical link studs.

4. The cell according to claim 1, wherein each of said connecting plates is arranged firstly on the pin with which said connecting plate is associated, said pin projecting outside a passage passing through the envelope so as to engage, in a complementary manner, with a threaded passage of the electrical link stud and also in direct contact with conducting electrical connectors of the stud.

5. The cell according to claim 1, wherein for a pin, the means to prevent rotation include a bottom plate that includes a casing, said casing having a shape which is complementary to a shoulder of the pin and includes a flat spot.

6. The cell according to claim 5, wherein each pin is mounted to float in its casing and in a hole of the connecting plate, in order to allow the self-centering of the pin in relation to the terminal.

7. The cell according to claim 1, wherein the connecting plates are two concentrators of electrical energy, with each of which are associated individual connection means that are connectable to electrodes that are included in the electrochemical elements and a hole allowing it to be threaded onto a body of the pin with which it is associated.

8. The cell according to claim, wherein the cell also includes, inside the sealing envelope, a top plate with two circular holes, each allowing passage of the body of a pin, said top plate including reception elements that mate with click-on fittings on a bottom plate, thus locking the connecting plates and the shoulders of the pins.

9. The cell according to claim 8, wherein each stud includes a channel, and the top plate includes at least one collar, said channel and collar forming a casing to compress a sealing ring between each stud and the sealing envelope flattened against the top plate.

10. A cell according to claim 9, wherein each collar of the top plate constitutes an electrical separator between the envelope and each stud, thus providing an electrical insulation between said envelope and said stud.

11. The cell according to claim 1, wherein the sealing rings are o-rings.

12. The cell according to claim 1, wherein each electrical link stud has, as conducting connectors, a flat surface that includes splines that are designed, when clamped, to favor the electrical contact between the connecting plates and the studs.

13. The cell according to claim 1, wherein the electrical link studs are connectable to a flexible electrical interconnection strip connecting the cell to an electronic device for controlling the status of the cell.

14. The cell according to claim 1, wherein each electrical link stud also includes a primary shoulder that is designed to be assembled with an electrically-conducting connecting part of the power connecting device, and spring elements, for connecting to a terminal of an adjacent cell, with an intermediate contact part being interposed between the electrically-conducting connecting part and the terminal in order to favor the electrical contact between the said parts.

* * * * *